US009081996B2

(12) United States Patent
Kodialam et al.

(10) Patent No.: US 9,081,996 B2
(45) Date of Patent: Jul. 14, 2015

(54) IDENTIFYING RFID CATEGORIES

(75) Inventors: Murali Kodialam, Marlboro, NJ (US);
Thyaga Nandagopal, Edison, NJ (US);
Wing C. Lau, Hong Kong (CN)

(73) Assignee: Alcatel Lucent, Boulogne-Billancourt (FR)

( * ) Notice: Subject to any disclaimer, the term of this patent is extended or adjusted under 35 U.S.C. 154(b) by 813 days.

(21) Appl. No.: 12/470,061

(22) Filed: May 21, 2009

(65) Prior Publication Data
US 2010/0295659 A1 Nov. 25, 2010

(51) Int. Cl.
*G08B 21/00* (2006.01)
*G06K 7/00* (2006.01)
*G06K 7/10* (2006.01)

(52) U.S. Cl.
CPC .......... *G06K 7/0008* (2013.01); *G06K 7/10059* (2013.01)

(58) Field of Classification Search
USPC .................. 705/22, 28; 375/138; 370/341
See application file for complete search history.

(56) References Cited

U.S. PATENT DOCUMENTS

| | | | |
|---|---|---|---|
| 4,398,289 A | 8/1983 | Schoute | |
| 5,212,806 A | 5/1993 | Natarajan | |
| 5,506,848 A * | 4/1996 | Drakopoulos et al. | 370/336 |
| 5,530,702 A * | 6/1996 | Palmer et al. | 370/445 |
| 5,940,006 A * | 8/1999 | MacLellan et al. | 370/314 |
| 6,418,436 B1 | 7/2002 | Degen et al. | |
| 6,538,563 B1 * | 3/2003 | Heng | 340/10.2 |
| 6,563,417 B1 | 5/2003 | Shaw | |
| 6,859,801 B1 | 2/2005 | Law et al. | |
| 6,963,270 B1 * | 11/2005 | Gallagher et al. | 340/10.2 |
| 7,035,818 B1 * | 4/2006 | Bandy et al. | 705/28 |
| 7,095,754 B2 | 8/2006 | Benveniste | |
| 7,103,470 B2 | 9/2006 | Mintz | |
| 7,486,172 B2 | 2/2009 | Martinez et al. | |
| 7,684,343 B2 | 3/2010 | Vasil'evich et al. | |
| 2002/0063622 A1 | 5/2002 | Armstrong et al. | |
| 2002/0118661 A1 | 8/2002 | Voce | |
| 2002/0154653 A1 | 10/2002 | Benveniste | |
| 2002/0163933 A1 | 11/2002 | Benveniste | |
| 2003/0105853 A1 * | 6/2003 | Morito et al. | 709/223 |
| 2003/0214389 A1 | 11/2003 | Arneson et al. | |
| 2004/0012486 A1 * | 1/2004 | Mani | 340/10.2 |

(Continued)

FOREIGN PATENT DOCUMENTS

| | | |
|---|---|---|
| JP | 11-282975 A | 10/1999 |
| JP | 2005025691 A | 1/2005 |

(Continued)

*Primary Examiner* — Mark Rushing
(74) *Attorney, Agent, or Firm* — Mendelsohn, Drucker & Dunleavy, P.C.; Kevin Drucker (57) ABSTRACT

The set T of all categories in a population of RFID tags is estimated within a specified error bound. For each of one or more frames, a reader broadcasts a probability p, a multiplicity d, a frame size M, and a seed value R to the present tags. A deterministic algorithm on each tag, and known to the reader, calculates (i) whether the tag will transmit in this frame, and, if so, (ii) in which slots the tag will transmit a single "1." When the tags have responded, the reader calculates set T by initially assuming that all possible categories are in set T and then eliminating those categories that would have transmitted in those slots in which no tag transmitted. Alternatively, the reader initially assumes that set T is empty, and adds those categories that would have transmitted in those slots in which one or more tags did transmit.

15 Claims, 4 Drawing Sheets

(56) References Cited

U.S. PATENT DOCUMENTS

| | | |
|---|---|---|
| 2004/0046642 A1 | 3/2004 | Becker et al. |
| 2005/0035849 A1 | 2/2005 | Yizhack |
| 2006/0044114 A1 | 3/2006 | Friedrich et al. |
| 2006/0071758 A1* | 4/2006 | Cooper et al. ............... 340/10.2 |
| 2006/0101168 A1 | 5/2006 | Roh et al. |
| 2006/0208860 A1 | 9/2006 | Park et al. |
| 2007/0070896 A1 | 3/2007 | Alapuranen et al. |
| 2007/0075838 A1 | 4/2007 | Powell |
| 2007/0096877 A1 | 5/2007 | Quan et al. |
| 2007/0126555 A1 | 6/2007 | Bandy |
| 2007/0286227 A1 | 12/2007 | Koezuka |
| 2008/0012688 A1* | 1/2008 | Ha et al. ...................... 340/10.1 |
| 2008/0150692 A1 | 6/2008 | Missimer et al. |
| 2008/0180222 A1 | 7/2008 | Hollister et al. |
| 2008/0187002 A1 | 8/2008 | Becker |
| 2008/0187003 A1 | 8/2008 | Becker |
| 2008/0297324 A1* | 12/2008 | Tuttle ......................... 340/10.33 |
| 2009/0090584 A1* | 4/2009 | Chakra et al. .................. 186/61 |
| 2009/0179738 A1 | 7/2009 | Kageyama |
| 2010/0039237 A1* | 2/2010 | Radhakrishnan et al. ... 340/10.4 |

FOREIGN PATENT DOCUMENTS

| | | |
|---|---|---|
| JP | 2006050049 A | 2/2006 |
| JP | 2006-238381 A | 9/2006 |
| WO | WO 2005/048180 A1 | 5/2005 |

* cited by examiner

IDENTIFYING RFID CATEGORIES

BACKGROUND OF THE INVENTION

1. Field of the Invention

The invention relates to digital communication, and more specifically to Radio Frequency Identification (RFID).

2. Description of the Related Art

Advances in supply-chain technologies are promoting the rapid deployment of RFID tags to identify individual items, such as passports, retails products, books, or even humans.

Figure 1:
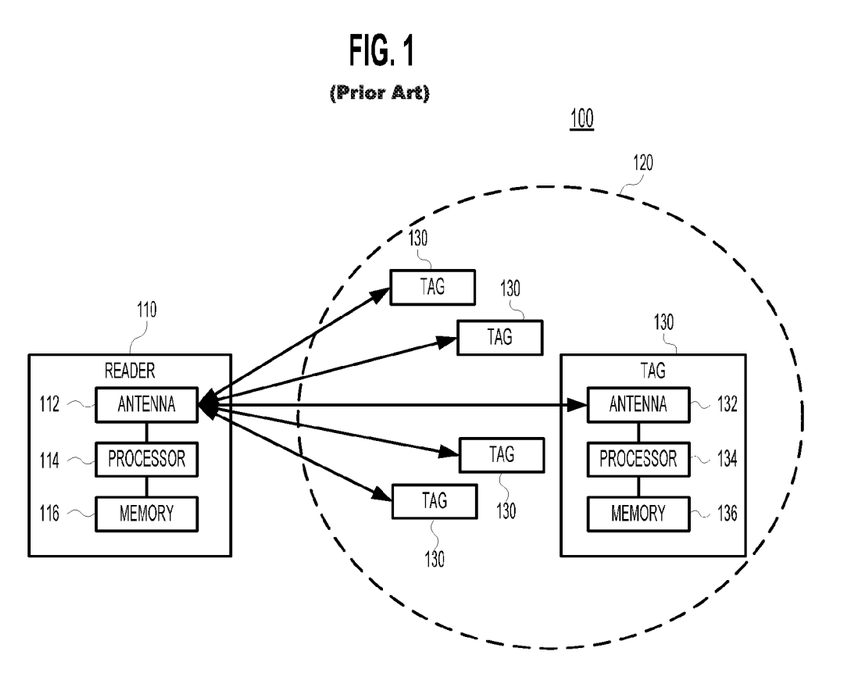
FIG. 1 is a block diagram of conventional RFID system 100.

FIG. 1 is a block diagram of conventional RFID system 100. RFID system 100 comprises reader 110 and one or more RFID tags 130 that are within the interrogation zone 120 of reader 110.

Reader 110 comprises an antenna 112, a processor 114, and a memory 116. A typical tag 130 comprises (i) an antenna 132, (ii) a memory 136, and (iii) a processor 134 for rudimentary calculations. FIG. 1 shows details for only one tag, but each tag comprises the same components. A typical tag contains within its memory a unique 12-digit hexadecimal tag identifier (tag ID), comprising an 8-digit hexadecimal category code (i.e., category ID) and a unique 4-digit hexadecimal instance within that category. For example, a particular tag ID value might be 048AF742C12D, where 048AF742 is the category ID value, and C12D is the unique instance value for that category ID value. Whereas the tag ID value is meant to be unique, multiple tags can have the same category ID value.

A typical use of system 100 is to determine which tags, and hence, which objects are within the system. This determination is made by performing an interrogation. For a time duration known as a frame, reader 110 emits from antenna 112 a downlink signal, which energizes tags 130 within interrogation zone 120. Also within the frame duration, each energized tag 130 transmits an uplink signal back to reader 110. A typical uplink signal contains the tag ID value. Reader 110 collects and collates the received tag IDs and generates a list of which tag IDs are in the system.

A potential problem with the interrogation procedure is collisions, i.e., when two or more tags transmit at the same time. A reader that receives a collision typically cannot determine how many tags transmitted to generate the collision, or which tags transmitted to generate the collision. As such, the reader cannot state with certainty which tags are in the system.

One protocol, called framed slotted ALOHA, reduces collisions by dividing the frame into a number M of equal-sized slots, where each slot has a time duration long enough for a tag to transmit the information requested, e.g., the tag ID. The number M of slots in a frame is also referred to as the frame size M.

At the start of a frame, the reader sends two pieces of information to the tags: the frame size M and a seed value R. Each tag's integrated circuit is capable of implementing a tag algorithm (e.g., a uniform hash function) that takes the seed value R, the frame size M, and the tag ID, and generates a pseudo-random slot index number. Each tag transmits its tag ID during the slot corresponding to its generated slot index number. Depending on the tag algorithm, the algorithm's input parameters, and the different tags are that present in the system, a tag may be the only tag transmitting in its slot or the tag's slot may correspond to a collision, in which the tag and one or more other tags transmit their tag IDs at the same time. When a tag is the only tag transmitting in its slot, then the reader is able to identify that tag as being present. When a collision occurs in a slot, the reader is unable to identify the particular tags transmitting during that slot.

If the reader detects one or more collisions, then the reader selects a different seed value R and starts another frame. Because the seed R is different, the tags will generate a different pseudo-random set of slots in which to transmit, such that tags that previously collided with other tags might not collide in the current frame.

Frames are performed until all tags have been identified, or the process is terminated by some specified threshold, such as a maximum number of frames. The total number of performed frames is denoted r. The total number of slots in all the performed frames is known as the scan length m. Thus, $m = r \cdot M$. The one or more frames used to identify the tags in the system may be referred to as corresponding to a single interrogation of the system.

The example given above focused on determining the particular tag IDs that are present in a system. However, some applications might need to know only the categories of products that are present in the system without having to identify each different product. For such applications, it may be sufficient to identify only the different category IDs for the tags that are present in the system, as opposed to identifying the particular tags IDs.

SUMMARY OF THE INVENTION

In one embodiment, the invention is a tag for an RFID system further comprising a reader. The tag comprises a memory, an antenna, and a processor. The memory is adapted to store a tag identification (ID) value for the tag, the tag ID value comprising a category ID value and an instance value. The antenna is adapted to receive a downlink signal from the reader and transmit an uplink signal to the reader. The processor is adapted to process the downlink signal and generate the uplink signal. Specifically, the processor is adapted to (i) select at least one slot in a multi-slot frame based on the stored category ID value, but independent of the stored instance value, and (ii) transmit the uplink signal in the at least one selected slot in the multi-slot frame.

In another embodiment, the invention is a tag for an RFID system further comprising a reader. The tag comprises a memory, an antenna, and a processor. The memory is adapted to store a tag identification (ID) value for the tag, the tag ID value comprising a category ID value and an instance value. The antenna is adapted to receive a downlink signal from the reader and transmit an uplink signal to the reader. The processor is adapted to process the downlink signal and generate the uplink signal, wherein the processor is adapted to (i) select two or more different slots in a multi-slot frame, and (ii) transmit the uplink signal in each of the two or more different selected slots in the multi-slot frame.

In yet another embodiment, the invention is a tag for an RFID system further comprising a reader. The tag comprises a memory, an antenna, and a processor. The memory is adapted to store a tag identification (ID) value for the tag, the tag ID value comprising a category ID value and an instance value. The antenna is adapted to receive a downlink signal from the reader and transmit an uplink signal to the reader. The processor is adapted to process the downlink signal and generate the uplink signal, wherein the uplink signal corresponds to a single bit value.

In yet another embodiment, the invention is a reader for an RFID system further comprising one or more tags, the reader comprising a processor and an antenna. The processor is adapted to generate a downlink signal, and the antenna is adapted to transmit the downlink signal to the one or more tags and receive one or more uplink signals from the one or more tags. The processor is further adapted to process the one or more uplink signals. The downlink signal comprises a multiplicity value indicating a number of slots, such that a tag that transmits an uplink signal in response to receipt of the downlink signal will (1) select two or more different slots in a multi-slot frame based on the multiplicity value and (2) transmit the uplink signal in each of the two or more different selected slots in the multi-slot frame.

In yet another embodiment, the invention is a reader for an RFID system further comprising one or more tags. The reader comprises a processor adapted to generate a downlink signal and an antenna adapted to transmit the downlink signal to the one or more tags and receive one or more uplink signals from the one or more tags. Each tag is associated with a tag ID value comprising a category ID value and an instance value. The one or more tags correspond to one or more categories. The processor is further adapted to process the one or more uplink signals to estimate the one or more categories without identifying any of the one or more tags.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

The set of all possible tag categories is denoted N, and the number of distinct categories in set N, i.e., the cardinality of set N, is denoted n. The set of distinct categories currently present in a particular RFID system is denoted T, and the number of distinct categories in set T, i.e., the cardinality of set T, is denoted t. It is assumed that set N and cardinality n are known quantities, and that cardinality t can be estimated. One method for estimating cardinality t can be found in U.S. patent application Ser. No. 11/525,339 filed on Sep. 22, 2006, which application is herein incorporated by reference in its entirety.

Various embodiments of the present invention are systems and methods for efficiently determining, with probability greater than $1-\epsilon$, where $0<\epsilon<1$, the set T of distinct categories present in an RFID system. In other words, on average, out of $1/\epsilon$ interrogations to identify set T, no more than one interrogation should have any false positive or false negative.

An RFID system according to various embodiments of the present invention is analogous to RFID system 100 of FIG. 1. Specifically, the system architecture is the same, but the internal operation of some or all of the components will differ. From this point on, unless explicitly stated otherwise, all references to FIG. 1 and its components will be references to various embodiments of the present invention.

According to various embodiments of the present invention, all tags 130 in RFID system 100 contain an identical, deterministic tag algorithm that takes (i) parameters received from the reader and (ii) the tag's category ID and determines (a) whether a tag will transmit in a given frame, and, if so, (b) the slot(s) in which the tag will transmit. Because the tag algorithm is deterministic and identical for all tags, all tags with the same category ID will transmit in the same frames, and in the exact same slots within those selected frames. It is possible for tags belonging to two or more different categories to transmit in the same slot in a given frame. It is also possible for a tag to transmit in a slot that would also have been used by tags of a different category that is not present in the system.

According to various embodiments of the present invention, tags transmit a single bit, i.e., a slot can be as small as one bit long. If no tag transmits in a given slot, then the slot is referred to as a zero slot. If one or more tags transmit in a given slot, then the slot is referred to as a non-zero slot. Non-zero slots include both (i) slots where only a single tag transmits and (ii) slots where multiple tags transmit, resulting in collisions.

The reader knows the tag algorithm. Thus, the reader can determine, a priori, which categories of tags can and cannot transmit in a given slot. Furthermore, because the set N of all possible categories, the number n of distinct categories in set N, and the number t of distinct categories in the system are known quantities, the reader can calculate (e.g., see Equations (1)-(25), below), a priori, the minimum number in of total slots required to identify the distinct categories within a specified error threshold.

Figure 2:
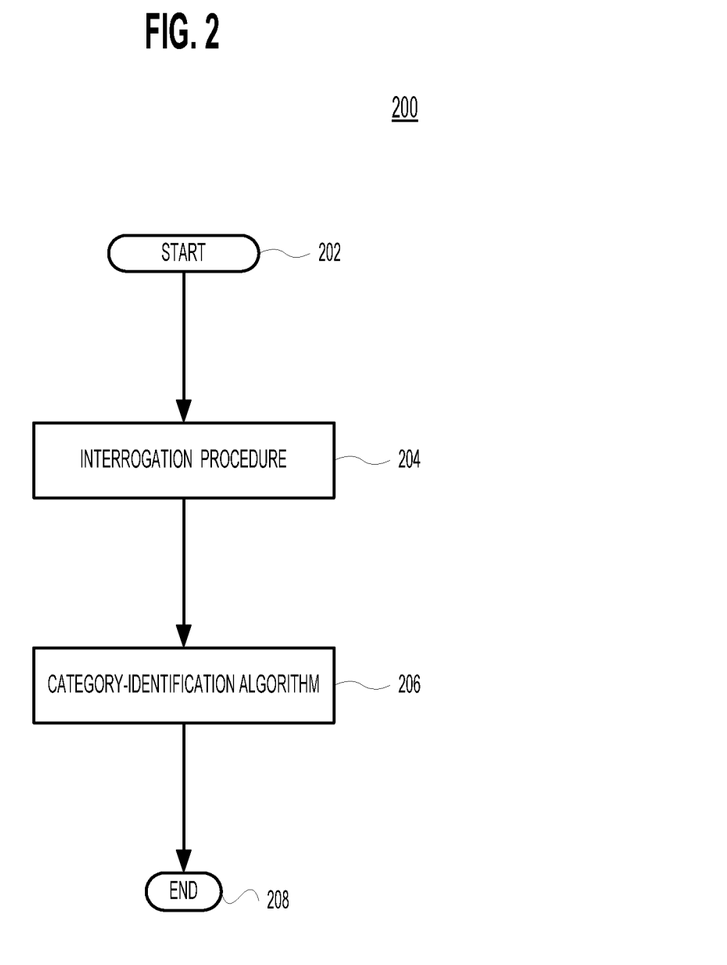
FIG. 2 is a top-level flowchart of process 200 executed by RFID system 100 of FIG. 1 to estimate the set T of distinct categories in the system, according to certain embodiments of the present invention.

FIG. 2 is a top-level flowchart of process 200 executed by RFID system 100 of FIG. 1 to estimate the set T of distinct categories in the system, according to certain embodiments of the present invention. Processing begins at step 202 and proceeds to interrogation procedure 204 where reader 110 interrogates tags 130, and the tags respond by transmitting data back to the reader. Next, category-identification algorithm 206 analyzes the responses from tags 130 and generates an estimate of the set T of distinct categories present in system 100. Processing then terminates at step 208.

Interrogation Procedure

Figure 3:
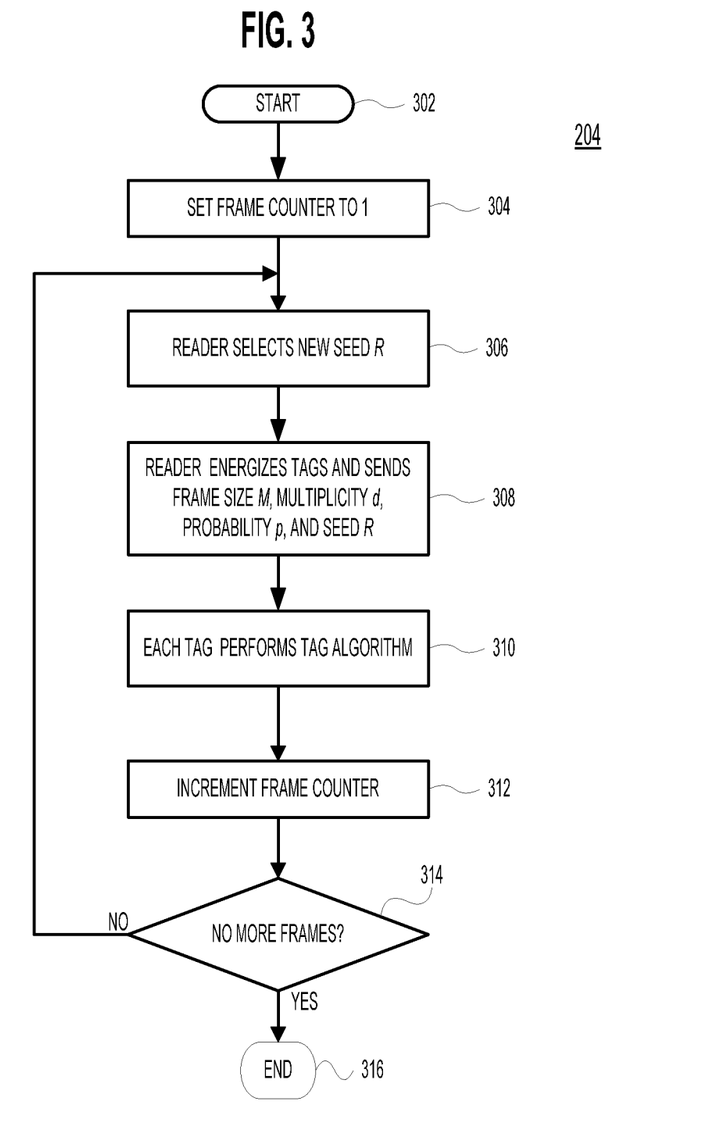
FIG. 3 is a flowchart of interrogation procedure 204 of FIG. 2 according to one embodiment of the present invention.

FIG. 3 is a flowchart of interrogation procedure 204 of FIG. 2 according to one embodiment of the present invention.

Processing starts at step 302 and proceeds to step 304 where a frame counter is initialized to 1. Next, at step 306, reader 110 selects a new seed value R. Next, at step 308, reader 110 energizes tags 130 in the system and broadcasts the frame size M, a multiplicity value d, a probability value p, and the seed value R. This particular scheme is referred to as an (M,d,p) scheme. The probability value p, which ranges from 0 to 1, indicates the relative probability that a tag will participate in the current frame. If all tags are expected to participate in that frame, e.g., in a single-frame interrogation procedure, then the probability value p will be set to 1. If a tag determines that it is to participate in the current frame, then the multiplicity value d indicates the number of slots in that frame during which the tag will transmit.

Next, in step 310, each tag (i) takes the frame size M, multiplicity d, probability p, seed value R, and the tag's category ID, (ii) determines whether to transmit in the current frame, and, if so, calculates the d slots in which to transmit, and (iii) transmits a "1" in each of the d slots. Step 310 is discussed in greater detail in the discussion of FIG. 4 below.

Next, in step 312, the frame counter is incremented. Then, at step 314, it is determined whether the frame counter is greater than the total number r of frames in the current interrogation, i.e., whether all r frames have been performed. If so, then interrogation procedure 204 terminates at step 316; otherwise, processing loops back to step 306 for the next frame in the current interrogation.

Figure 4:
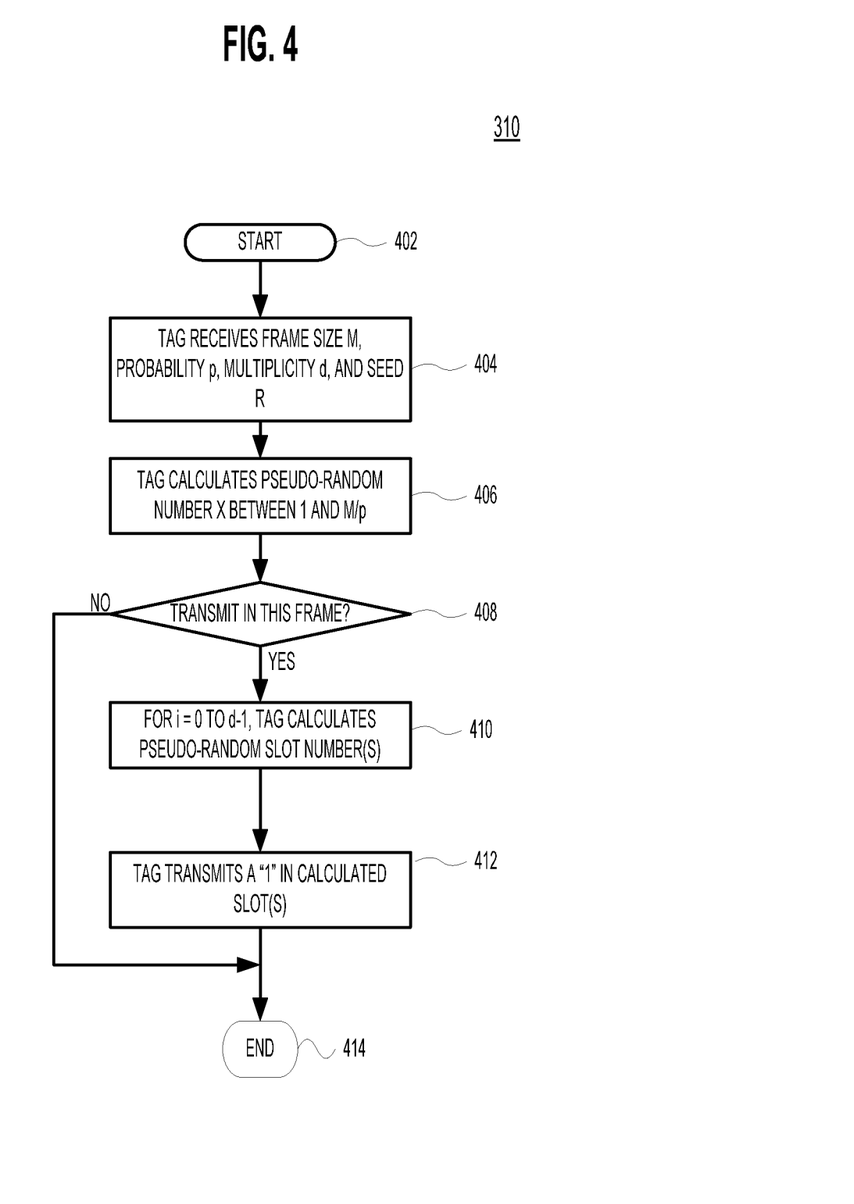
FIG. 4 is a flowchart of tag algorithm 310 of FIG. 3 for each tag.

FIG. 4 is a flowchart of tag algorithm 310 of FIG. 3 for each tag. Processing starts at step 402 and proceeds to step 404 where tag 130 receives the frame size M, the multiplicity value d, the probability value p, and the seed value R.

Next, in step 406, the tag pseudo-randomly picks a number X between 1 and M/p. In particular, in one implementation, the tag generates the number X by concatenating the seed value R and the tag's category ID, hashing the result with a standard hash algorithm (e.g., SHA-1, MD5), and then calculating the hash result modulo M/p. In one possible implementation, the seed value R is an 8-digit hexadecimal number.

Step 408 determines whether or not the tag will transmit during the current frame. In particular, if the number X is greater than the frame size M, then the tag will not transmit during the current frame and process 310 terminates at step 414; otherwise, the tag will transmit during the current frame and processing continues to step 410. Note that, in a single-frame interrogation procedure, the probability value p will be set to 1, and, thus, step 408 will always evaluate to yes.

In step 410, the tag algorithm computes the d slots in which the tag is to transmit. Specifically, for each index value i from 0 to d−1, a sum is generated by adding together the tag's category ID, the index value i, and the seed value R, and the sum is then hashed using a standard hash function (e.g., SHA-1, MD5). The resulting hash value modulo the frame size M identifies one of the d slots in which the tag is to transmit.

Then, at step 412, the tag transmits a "1" in the d calculated slots. Processing then terminates at step 414.

Interrogation procedure 204 can accommodate any number of frames in an interrogation. If there is no limit on the frame size M, or if the number t of categories is small compared to frame size M, then a single frame may be sufficient to correctly estimate set T with a probability greater than $1-\epsilon$. In cases where there is restriction on the maximum frame size, the single-frame method gives a lower bound on the number of slots needed. Note that, in a single-frame scenario, the scan length m equals the frame size M. Furthermore, in the single-frame interrogation procedure, all tags, and thus, all categories in set T, will transmit in the frame, i.e., the probability value p is set to 1. Thus, a single-frame scheme may be referred to as an (M,d) or (m,d) scheme.

If, instead, there are a large number of categories to be identified by a system utilizing a fixed frame size, then multiple frames may be required to perform the interrogation procedure to within the desired level of accuracy. Thus, the scan length m will correspond to a number r of fixed frames of size M, i.e., m=r·M.

Note that, while interrogation procedure 204 is the same for single-frame or multiple-frame interrogations, the category-identification algorithms 206 used for the two scenarios might differ. The variants of category-identification algorithm 206 are explained in greater detail below. Likewise, the process for determining the optimal parameters for a single-frame interrogation procedure differs from the analogous process for a multiple-frame interrogation procedure. Both of these processes are described in greater detail below.

Category-Identification Algorithms

At the end of interrogation procedure 204, the reader knows the set Z of zero slots and the set C of non-zero slots. Additionally, because the reader knows the deterministic algorithm used by the tags to select frames and slots in which to transmit, the reader knows the set of categories that can transmit in any given slot. Given these inputs, the task is to determine, with a probability greater than $1-\epsilon$, the set T of all distinct categories present in the system.

In certain embodiments of the present invention, category-identification algorithm 206 is based on category elimination. The category-elimination algorithm starts by assuming that T contains all categories that could have transmitted during the interrogation.

In a single-frame scenario, where probability p is equal to 1 and thus all tags in the system will transmit in the interrogation's single frame, the elimination algorithm starts by setting set T equal to the set N of all possible categories. For each zero slot, the reader determines which categories would have transmitted in the slot, had they been present, and deletes those categories from T. When all zero slots have been processed, T is declared final.

In a multiple-frame scenario, the elimination algorithm first determines, for a frame k, the set $T_k$ of categories that could have participated in frame k. For each zero slot in k, the reader determines which categories would have transmitted in the slot, had they been present, and deletes those categories from $T_k$. When all zero slots in k have been processed, $T_k$ is declared final. When all frames have been processed in this manner, T is set equal to the union of all sets $T_k$.

In other embodiments of the present invention, category-identification algorithm 206 is based on category inclusion. An inclusion-based algorithm initially assumes that set T is empty, and, for each non-zero slot, adds to T all categories that could have transmitted in that non-zero slot. The inclusion-based algorithm is the same for both single-frame and multi-frame scenarios.

Determining Optimal Scanlength in for Single-Frame Category-Identification Scheme An operator of an RFID system typically wants to know the optimal scanlength m, i.e., the minimum total number in of slots required to identify the categories in the system with a probability greater than $1-\epsilon$. This is typically a function of the number t of categories present, the potential number n of categories, as well as the error bound $\epsilon$. The optimal scanlength in may be important to know when using battery-operated readers that have limited scanlengths, or where the items to be identified are in motion (e.g., railroad, ships) and thus might be in the reader's interrogation zone for only a relatively short time.

The probability that a given slot j is picked by tags of a category in set T is the multiplicity d divided by the scanlength m, i.e., d/m. Consequently, the probability that slot j is not picked by a category in set T is $$1 - \frac{d}{m}.$$

Therefore, the probability that none of the t categories pick slot j, i.e., that slot j is a member of the set Z of zero slots, is given by Equation (1):

$$Pr[j \in Z] = \left(1 - \frac{d}{m}\right)^t \qquad (1)$$

Let $y_i^k$ denote the k-th slot (with respect to the d slots, not the in slots) picked by tags of category i. The probability that slot $y_i^k$ is not a member of the set Z of zero slots is equal to 1 minus the probability from Equation (1). Thus, Equation (2):

$$Pr[y_i^k \notin Z] = 1 - \left(1 - \frac{d}{m}\right)^t \quad (2)$$

Since the d slots are picked pseudo-randomly by each category, the probability that all d slots picked by category i are not elements of the set Z of zero slots is equal to the probability of Equation (2) raised to the power of d. Thus, in Equation (3):

$$Pr[y_i^1 \notin Z, y_i^2 \notin Z, \ldots, y_i^d \notin z] = (Pr[y_i^k \notin Z])^d \quad (3)$$
$$= \left(1 - \left(1 - \frac{d}{m}\right)^t\right)^d$$

For any category i∈N\T, if there is at least one slot $y_i^k$ in the set Z of zero slots, then category i is eliminated from set T. Category i is said to be in set G if there exists a value k where 1≤k≤d such that slot $y_i^k \in Z$. In other words, G is the set of all categories i that are eliminated from set T. Thus, the probability that category i is a member of set G is equal to 1 minus the probability of Equation (3). Therefore, in Equation (4):

$$Pr[i \in G] = 1 - \left(1 - \left(1 - \frac{d}{m}\right)^t\right)^d \quad (4)$$

The fact that categories pick slots in a pseudo-random manner means that the probability that a member of set T will be found to be a member of set G is equal to the probability of Equation (4) raised to the power of n−t, i.e., the number of categories that are not members of set T. Thus, Equations (5) and (6):

$$Pr[i \in G \forall i \in T] = \left(1 - \left(1 - \left(1 - \frac{d}{m}\right)^t\right)^d\right)^{n-t} \quad (5)$$

$$Pr[i \in G \forall i \in T] \geq \left(1 - \left(1 - \left(1 - \frac{d}{m}\right)^t\right)^d\right)^n \quad (6)$$

Note that, when all categories i∉T belong to set G, then all these categories will be eliminated, and the remaining categories will belong to set T. Since the goal is to identify set T with probability greater than 1−ϵ, in Equation (7):

$$g(m, d) = \left(1 - \left(1 - \left(1 - \frac{d}{m}\right)^t\right)^d\right)^n \geq 1 - \varepsilon \quad (7)$$

In other words, the goal is to pick an (m,d) scheme that achieves the bound of Equation (7) using the minimum scanlength m. The value of multiplicity d is chosen appropriately to minimize the value of scanlength m. Another way of looking at this problem is to fix the value of scanlength m and find the value of multiplicity d that minimizes the following Equation (8):

$$f(d) = \left(1 - \left(1 - \frac{d}{m}\right)^t\right)^d \quad (8)$$

Once this is done, a value of scanlength m is found that meets the high probability bound. In order to find the optimal value of multiplicity d, an approximation is made by setting $$\left(1 - \frac{d}{m}\right)^t \approx e^{\frac{-td}{m}},$$

which, when used in Equation (8), yields the following Equation (9):

$$f(d) = \left(1 - e^{-\frac{td}{m}}\right)^d = e^{-\frac{m}{t}\ln\left(e^{-\frac{td}{m}}\right)\ln\left(1-e^{-\frac{td}{m}}\right)} \quad (9)$$

Note that the above Equation (9) is minimized when the exponent is maximized. This occurs when $$e^{-\frac{td}{m}} = \frac{1}{2},$$

which implies that multiplicity $$d = \frac{m}{t}\ln 2.$$

Submitting this value for the multiplicity d in g(m,d) of Equation (7) yields Equation (10):

$$g(m, d) = \left(1 - \alpha^{\frac{m}{t}}\right)^n \quad (10)$$
where $\alpha = 2^{-\ln 2} \approx 0.6185$.

We now set $$1 - \epsilon \leq \left(1 - n\alpha^{\frac{m}{t}}\right) \leq \left(1 - \alpha^{\frac{m}{t}}\right)^n$$

using the binomial equality. This implies that $$n\alpha^{\frac{m}{t}} \leq \epsilon.$$

Solving for scanlength m, and using α<1 yields the following Equation (11):

$$m \geq \frac{-1}{\ln \alpha} t \ln\left(\frac{n}{\epsilon}\right) \quad (11)$$

Using the value of α from Equation (10) in Equation (11), and using −1/ln α=(ln 2)$^{-2}$≤2.082, yields the following theorem. In the single-frame category-identification scheme described above, given the number n of possible categories, the number t of categories present, and an experimental error bound $\epsilon$, the minimum number m of slots needed by the single-frame identification algorithm to correctly identify the set T of categories present with probability $1-\epsilon$ is given by the following Equation (12):

$$m \geq 2.082 t \ln\left(\frac{n}{\epsilon}\right) \quad (12)$$

Note that the number of slots increases linearly with the number t of categories present, but only increases logarithmically with the total potential number n of categories. Since the total category space is constant, the scanning delay for category identification is linear in cardinality t.

In a single-frame system optimized according to Equation (12), $m/d=1.44t$.

Alternative Single-Frame Interrogation Procedure

In an alternative single-frame interrogation procedure, each frame is divided into d sub-frames, where each sub-frame has $[m/d]=[1.44t]$ slots (where the $\lceil\ \rceil$ brackets indicate that the result should be rounded up to the next integer. The value of 1.44t comes from the single-frame optimization of Equation (12).

The multiplicity d is set to 1, i.e., if a tag participates in a subframe, then the tag will transmit on a single slot. The interrogation procedure used is procedure 204 of FIG. 3, except that the frame counter is now a sub-frame counter. Once procedure 204 is complete, the reader executes either the multi-frame elimination algorithm or the inclusion algorithm to determine the set T of categories present.

In the exemplary single-frame interrogation procedure described earlier, tags need to be able to (i) calculate the index numbers of d slots in which to transmit, (ii) store all d calculated slot index values, and (iii) sort the d slot index values in ascending order. In contrast, the alternative single-frame interrogation procedure requires the tag to calculate only one slot per sub-frame. As such, the alternative single-frame interrogation procedure requires fewer computing resources on the tag.

Determining Optimal Scanlength in for Multiple-Frame Category-Identification Method In order for the multi-frame elimination algorithm to correctly identify set T, two conditions must be satisfied. First, each category i that is a member of the set N\T of all categories that are not present in the system, should be "scheduled" to participate in at least one frame. Scheduled means that the system parameters are selected such that if category i were present, it would participate in at least one frame. Second, if category i is not an element of set T, i.e., i∈N\T, then category i should not be identified as having participated in any time slot.

Users of an RFID system typically want to know the optimal system parameters for a multiple-frame scenario, i.e., given a fixed frame size M, what is the minimum number r of frames (and, thus, the minimum scanlength m) needed to satisfy these two conditions with probability greater than $1-\epsilon$.

Let k index the frames, let j index the slots, and let $S_j^k$ denote the set of categories that are supposed to transmit in slot j in frame k (given the probability p). Let $Z_k$ denote the set of zero slots in frame k. Let $Y_i^k$ denote the indicator that will be set to one if we determine that category i is present in frame k.

If a non-present category i (i.e., i∈N\T) is not eliminated in frame k, then either (i) category i is not scheduled in frame k with probability $(1-p)$ or (ii) category i is scheduled in frame k, but not detected, i.e., none of the slots picked by category i map to any slot in the set $Z_k$ of zero slots of frame k (i.e., other, present categories transmit in each of categories i's slots in frame k). The probability that a non-present category is not eliminated in frame k is expressed in Equation (14):

$$Pr[Y_i^k \neq 0, i \in N\backslash T] = (1-p) + p(Pr[i \in \cup_{j \in Z^k} S_j^k]) \quad (14)$$

where the first term on the right-hand side (R.H.S.) represents the probability that the category does not participate in this frame, and the second term on the R.H.S. represents the probability that the category is scheduled for frame k, but not detected.

The probability that a category i participates in a frame is p. The probability that category i picks a given slot j within a frame is $$p\frac{d}{M}.$$

Thus, the probability that category i does not pick slot j is $$1 - p\frac{d}{M}.$$

The probability that no category in set T picks slot j is $$\left(1 - p\frac{d}{M}\right)^t.$$

A slot j is empty (i.e., j∈$Z^k$) if none of the categories in set T maps to slot j. Thus, the probability that slot j is empty is expressed in Equation (15):

$$Pr[j \in Z^k] = \left(1 - p\frac{d}{M}\right)^t \quad (15)$$

If the probability that a slot is empty is $$\left(1 - p\frac{d}{M}\right)^t,$$

then the probability that a slot is not empty is $$1 - \left(1 - p\frac{d}{M}\right)^t.$$

Thus, the probability that all d slots that would have been selected by a scheduled, non-present category i are not empty is $$\left(1 - \left(1 - p\frac{d}{M}\right)^t\right)^d \approx \left(1 - e^{-\frac{pdt}{M}}\right)^d.$$

Plugging this expression into the second term of the R.H.S. of Equation (14) yields the following Equation (16):

$$\Phi = (1-p) + p(1 - e^{-\frac{pdt}{M}})^d \quad (16)$$

The probability $\Phi$ is the probability $Pr[Y_i^k \neq 0, i \in N\setminus T]$ of Equation (14) that a scheduled, but non-present category i does not get eliminated in a frame. Thus, the probability that a non-present category i does not get eliminated in all r frames is $\Phi^r$. Consequently, the probability that a non-present category i does get eliminated after processing all r frames is $(1-\Phi^r)$. Thus, the probability that all non-present categories (i.e., all categories in set $N\setminus T$) are scheduled and mapped to at least one zero slot in the r frames, thereby getting eliminated, is given by $(1-\Phi^r)^{n-t}$.

If a category is not scheduled (using the probability p) in any of the r frames, then the category is marked as present. Any category in set T, if scheduled in a frame, will never map to a zero slot. This implies that, for certain implementations of the probabilistic category identification algorithm to be successful, only non-present categories need to be eliminated. Thus, the probability that all categories in $N\setminus T$ can be eliminated and every category in set T can be identified is given by $(1-\Phi^r)^{n-t}$. In order to achieve the target estimation error requirement, the probability that every category in set T can be identified must be greater than 1 minus the error bound $\epsilon$, or, as defined by Equation (17):

$$(1-\Phi^r)^{n-t} \geq 1-\epsilon \quad (17)$$

The L.H.S. of Equation (17) can be maximized by minimizing the probability $\Phi$. Unlike the single-frame analysis, here the number t of categories can be much larger than the frame size M. If the probability $\Phi$ is minimized with respect to the multiplicity d, subject to the fact that $d \geq 1$, the minimum is obtained when $d=1$ for $t \geq M \ln 2$. Similarly, it can also be shown that, for $t \leq M$, the probability $\Phi$ is minimized when the probability $p=1$. Given these two observation, there are two separate optimization algorithms: one for $t \leq M$, and another for $t > M$.

Optimizing Multiple-Frame Category-Identification for $t \leq M$

For the range $t \leq M$, the probability $p=1$, and the multiplicity d is computed to minimize the probability $\Phi$ as shown in Equation (18):

$$\Phi = [1 - e^{-td/M}]^d \quad (18)$$

Minimizing the probability $\Phi$ with respect to the multiplicity d is similar to the single-frame analysis, and yields $e^{-td/M} = 0.5$, leading to $$d = \left\lceil \frac{M}{t} \ln 2 \right\rceil,$$

since the multiplicity d has to be an integer. Note that, for $M \ln 2 \leq t \leq M$, $d=1$. In order to eliminate all categories in set $N\setminus T$ with high probability, the system is configured so as to satisfy Equation (19):

$$(1-\Phi^r)^{n-t} = (1 - \alpha^{\frac{Mr}{t}})^{n-t} \geq 1-\epsilon \quad (19)$$

The lower bound for the number r of frames is derived from Equation (19). An approximation similar to the single-frame case is used, resulting in the following theorem. Given a fixed frame size M, the number n of possible categories, the number t of categories present where $t \leq M$, and an error bound $\epsilon$, the number r of fixed frames needed by the multiple-frame identification procedure to identify, with probability $1-\epsilon$, the set T of categories present is given by the following Equation (20):

$$r \geq \left\lceil \frac{2.0822t}{M} \ln \frac{n}{\epsilon} \right\rceil \quad (20)$$

Optimizing Multiple-Frame Category Identification for $t > M$

For the range $t > M$, $d=1$, and the probability p is computed to minimize the probability $\Phi$ in Equation (21):

$$\Phi = (1-p) + p\left[1 - \left(1 - \frac{p}{M}\right)^t\right] \quad (21)$$

Minimizing the probability $\Phi$ with respect to the number t of categories yields the optimum probability $p=M/(t+1)$. The minimum probability $\Phi \approx 1-M/et$, where e is the base of the natural logarithm (2.71828 ...). To eliminate categories that are not present, values are set in accordance with Equation (22):

$$(1-\Phi^r)^{n-t} = \left[1 - \left(1 - \frac{M}{et}\right)^r\right]^{n-t} \geq 1-\epsilon \quad (22)$$

Approximating Equation (22), as in the previous cases, yields Equation (23):

$$(n-t)\left(1 - \frac{M}{et}\right)^r \leq n\left(1 - \frac{M}{et}\right)^r \leq \epsilon \quad (23)$$

In order to get a simplified picture about the dependence of the number r of frames on the number t of categories, it is assumed that $M < 0.01\epsilon t$, and the above Equation (23) is rewritten as Equation (24):

$$e^{-\frac{rM}{et}} < \frac{\epsilon}{n} \quad (24)$$

Equation (24) provides the lower bound on the number of frames. In other words, given a fixed frame size M, the number n of possible categories, the number t of categories present in the system where $t > M$, and an error bound $\epsilon$, the number r of frames needed by the multiple-frame identification method to identify the set T of categories present with probability $1-\epsilon$ is given by Equation (25):

$$r \geq \left\lceil \frac{et}{M} \ln\left(\frac{n}{\epsilon}\right) \right\rceil \quad (25)$$

Each tag participates once in each frame with a probability of $M/(t+1)$.

Benefits of Certain Embodiments of the Present Invention

The category-identification processing time of some prior-art RFID identification methods, e.g., framed slotted ALOHA, is a linear function of the number of tags in the system. In other words, the larger the number of tags in the system, the longer it will take framed slotted ALOHA to identify set T. In contrast, the processing time of certain embodiments of the present invention scale linearly with the number t of distinct categories in the system. Thus, for example, certain embodiments of the present invention will take the same amount of time to identify set T in a system with t distinct categories, regardless of whether that system contains 10 tags or 1,000 tags.

Furthermore, certain embodiments of the present invention perform within a constant factor of a hypothetical oracle. The hypothetical oracle is an ideal category identification scheme in which all category IDs are serially transmitted without any collisions. Each transmission takes $\log_2 n=1.44 \ln n$ bits. Embodiments of the present invention have a competitive ratio of $1.44(1+\log_n(1/\epsilon))$ with respect to the hypothetical oracle. For $n=10^9$, $\epsilon=0.001$, the competitive ratio is 1.92.

Yet further, certain embodiments of the present invention offer security benefits not offered by other schemes. When responding to interrogation, tags respond with only a "1", and not the category ID or the tag ID. To determine the categories present, one needs to know the particular tag algorithm used. Assuming that the tag algorithm has been kept confidential, an adversary cannot listen in on an interrogation and thus learn which categories are present in a system.

Although the present invention has been described in the context of identifying the set T of distinct categories in a population of tags, the invention is not so limited. The present invention could also be used to generate a set of distinct tag IDs in the system. Instead of N representing the set of all categories, N would now represent the set of all possible tag IDs. Thus, for each slot, the reader would need to calculate which tag IDs can/cannot transmit in the slot.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A tag for an RFID system, the tag comprising:
a memory adapted to store a tag identification (ID) value for the tag, the tag ID value comprising (i) a category ID value shared with at least one other tag and selected from one of a plurality of predetermined values corresponding to different categories of RFID tags and (ii) an instance value;
an antenna adapted to receive a downlink signal from a reader and transmit an uplink signal to the reader; and
a processor adapted to process the downlink signal and generate the uplink signal, wherein:
the processor is adapted to select at least one slot in a multi-slot frame based on the stored category ID value, but independent of the stored instance value; and
the tag is adapted to transmit the uplink signal in the at least one selected slot in the multi-slot frame.

2. The invention of claim 1, wherein:
the processor is adapted to select at least one slot in the multi-slot frame; and
the tag is adapted to transmit the uplink signal in each of the at least one selected slot in the multi-slot frame.

3. The invention of claim 2, wherein:
the downlink signal comprises a multiplicity value indicating a number of slots; and
the processor is adapted to select the at least one slot based on the multiplicity value.

4. The invention of claim 1, wherein:
the downlink signal comprises a probability value; and
the processor is adapted to determine whether or not to transmit the uplink signal in the multi-slot frame based on the probability value.

5. The invention of claim 1, wherein the uplink signal corresponds to a single bit value.

6. The invention of claim 1, wherein:
the processor is adapted to select at least one slot in the multi-slot frame;
the tag is adapted to transmit the uplink signal in each of the at least one selected slot in the multi-slot frame;
the downlink signal comprises a multiplicity value indicating a number of slots;
the processor is adapted to select the at least one slot based on the multiplicity value;
the downlink signal comprises a probability value;
the processor is adapted to determine whether or not to transmit the uplink signal in the multi-slot frame based on the probability value; and
the uplink signal corresponds to a single bit value.

7. A tag for an RFID system, the tag comprising:
a memory adapted to store a tag identification (ID) value for the tag, the tag ID value comprising (i) a category ID value shared with at least one other tag and selected from one of a plurality of predetermined values corresponding to different categories of RFID tags and (ii) an instance value;
an antenna adapted to receive a downlink signal from a reader and transmit an uplink signal to the reader; and
a processor adapted to process the downlink signal and generate the uplink signal, wherein:
the processor is adapted to select at least one slot in a multi-slot frame; and
the tag is adapted to transmit the uplink signal in each of the at least one selected slots in the multi-slot frame, wherein:
the downlink signal comprises a multiplicity value indicating a number of slots; and
the processor is adapted to select the at least one slot based on the multiplicity value.

8. The invention of claim 7, wherein:
the downlink signal comprises a probability value; and
the processor is adapted to determine whether or not to transmit the uplink signal in the multi-slot frame based on the probability value.

9. The invention of claim 7, wherein the uplink signal corresponds to a single bit value.

10. A tag for an RFID system, the tag comprising:
a memory adapted to store a tag identification (ID) value for the tag, the tag ID value comprising (i) a category ID value shared with at least one other tag and selected from one of a plurality of predetermined values corresponding to different categories of RFID tags and (ii) an instance value;
an antenna adapted to receive a downlink signal from a reader and transmit an uplink signal to the reader; and
a processor adapted to process the downlink signal and generate the uplink signal, wherein the uplink signal corresponds to a single bit value, wherein:
the downlink signal comprises a probability value; and
the processor is adapted to determine whether or not to transmit the uplink signal in a multi-slot frame based on the probability value.

11. A reader for an RFID system, the reader comprising:
a processor adapted to generate a downlink signal;
an antenna adapted to transmit the downlink signal to one or more tags and receive one or more uplink signals from the one or more tags, wherein:
one or more uplink signals comprises a tag ID value comprising (i) a category ID value shared by at least two tags and selected from one of a plurality of predetermined values corresponding to different categories of RFID tags and (ii) an instance value; and
the processor is further adapted to process the one or more uplink signals to estimate the one or more categories without identifying any of the one or more tags.

12. The invention of claim 11, wherein each uplink signal corresponds to a single bit value.

13. The invention of claim 11, wherein:
the processor has knowledge of an association between one or more category ID values and one or more respective slots receiving an uplink signal in a multi-slot frame, but independent of the tag's instance value; and
the processor is adapted to estimate the one or more categories based on knowledge of which slots in the multi-slot frame have at least one uplink signal and which slots in the multi-slot frame have no uplink signal.

14. The invention of claim 13, wherein the processor estimates the one or more categories by implementing a category-elimination algorithm in which (1) for each multi-slot frame in an interrogation, the processor (a) initially assumes that the one or more tags correspond to all categories that can transmit in the multi-slot frame and (b) then eliminates categories corresponding to slots in the multi-slot frame having no uplink signal to generate a set of present categories for the multi-slot frame, and (2) if there are two or more multi-slot frames, then the processor performs a union of all the sets of present categories for each frame.

15. The invention of claim 13, wherein the processor estimates the one or more categories by implementing a category-inclusion algorithm in which the processor (1) initially assumes that the one or more tags correspond to no categories and (2) then includes categories corresponding to slots in the multi-slot frame having at least one uplink signal.

* * * * *